(12) United States Patent
Jeddeloh

(10) Patent No.: US 7,117,316 B2
(45) Date of Patent: Oct. 3, 2006

(54) MEMORY HUB AND ACCESS METHOD HAVING INTERNAL ROW CACHING

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 124 days.

(21) Appl. No.: 10/213,038

(22) Filed: Aug. 5, 2002

(65) Prior Publication Data
US 2004/0024978 A1 Feb. 5, 2004

(51) Int. Cl.
*G06F 13/00* (2006.01)

(52) U.S. Cl. .................. 711/154; 711/118; 711/105; 711/109; 345/557

(58) Field of Classification Search ............. 711/154, 711/118, 105, 109; 709/214; 345/557
See application file for complete search history.

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levi et al. | 711/162 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,891,808 A | 1/1990 | Williams | 370/112 |

(Continued)

FOREIGN PATENT DOCUMENTS

| | | |
|---|---|---|
| EP | 0849685 A2 | 6/1998 |
| JP | 2001265539 A | 9/2001 |
| WO | WO 93/19422 | 9/1993 |
| WO | WO 98/57489 | 12/1998 |
| WO | WO 200227499 A2 * | 4/2002 |

OTHER PUBLICATIONS

Intel, Intel 840 Chipset: 82840 Memory Controller Hub (MCH), Oct. 1999, 298020–001, entirity.*
"Free On–Line Dictionary of Computing" entry Flash Erasable Programmable Read–Only Memory, online May 17, 2004 [http://foldoc.doc.ic.ac.uk/foldoc/foldoc.cgi?flash+memory].
Intel, "Flash Memory PCI Add–In Card for Embedded Systems", Application Note AP–758, Sep., 1997, pp. i–13.
Shanley, T. et al., "PCI System Architecture", Third Edition, Mindshare, Inc., 1995, pp. 24–25.
Intel, "Intel 840 Chipset: 82840 Memory Controller Hub (MCH)", Datasheet, www. intel. com/ design/chipsets/datashts/298020.htm, Oct. 1999, pp. 1–178.

*Primary Examiner*—Hong Kim
(74) *Attorney, Agent, or Firm*—Dorsey & Whitney, LLP

(57) ABSTRACT

A computer system includes a controller coupled to a plurality of memory modules each of which includes a memory hub and a plurality of memory devices. The memory hub includes a row cache memory that stores data as they are read from the memory devices. When the memory module is not being accessed by the controller, a sequencer in the memory module generates requests to read data from a row of memory cells. The data read responsive to the generated read requests are also stored in the row cache memory. As a result, read data in the row being accessed may be stored in the row cache memory even though the data was not previously read from the memory device responsive to a memory request from the controller.

18 Claims, 2 Drawing Sheets

U.S. PATENT DOCUMENTS

| | | |
|---|---|---|
| 4,930,128 A | 5/1990 | Suzuki et al. ................... 371/12 |
| 4,953,930 A | 9/1990 | Ramsey et al. ............ 350/96.11 |
| 5,241,506 A | 8/1993 | Motegi et al. ................. 365/210 |
| 5,243,703 A | 9/1993 | Farmwald et al. ........... 395/325 |
| 5,269,022 A | 12/1993 | Shinjo et al. ................. 395/700 |
| 5,313,590 A | 5/1994 | Taylor ......................... 395/325 |
| 5,317,752 A | 5/1994 | Jewett et al. ................ 395/750 |
| 5,319,755 A | 6/1994 | Farmwald et al. ........... 395/325 |
| 5,327,553 A | 7/1994 | Jewett et al. ................ 395/575 |
| 5,355,391 A | 10/1994 | Horowitz et al. ............. 375/36 |
| 5,432,823 A | 7/1995 | Gasbarro et al. ............ 375/356 |
| 5,461,627 A | 10/1995 | Rypinski ................... 370/95.2 |
| 5,465,229 A | 11/1995 | Bechtolsheim et al. ...... 345/477 |
| 5,479,370 A | 12/1995 | Furuyama et al. ...... 365/189.12 |
| 5,502,621 A | 3/1996 | Schumacher et al. ........ 361/760 |
| 5,544,319 A | 8/1996 | Acton et al. ............ 395/200.07 |
| 5,566,325 A | 10/1996 | Bruce, II et al. ............ 395/494 |
| 5,577,220 A | 11/1996 | Combs et al. ............... 395/416 |
| 5,581,767 A | 12/1996 | Katsuki et al. .............. 395/800 |
| 5,606,717 A | 2/1997 | Farmwald et al. ........... 395/856 |
| 5,638,334 A | 6/1997 | Farmwald et al. ...... 365/230.03 |
| 5,638,534 A | 6/1997 | Mote, Jr. ..................... 395/485 |
| 5,687,325 A | 11/1997 | Chang ......................... 395/284 |
| 5,706,224 A | 1/1998 | Srinivasan et al. ............ 365/49 |
| 5,710,733 A | 1/1998 | Chengson et al. ............. 365/52 |
| 5,715,456 A | 2/1998 | Bennett et al. ............... 395/652 |
| 5,729,709 A | 3/1998 | Harness ......................... 711/5 |
| 5,748,616 A | 5/1998 | Riley ........................... 370/242 |
| 5,796,413 A | 8/1998 | Shipp et al. ................. 345/522 |
| 5,818,844 A | 10/1998 | Singh et al. ................. 370/463 |
| 5,819,304 A | 10/1998 | Nilsen et al. ................... 711/5 |
| 5,822,255 A | 10/1998 | Uchida ........................ 365/194 |
| 5,832,250 A | 11/1998 | Whittaker ................... 395/471 |
| 5,875,454 A | 2/1999 | Craft et al. .................. 711/113 |
| 5,887,159 A | 3/1999 | Burrows ...................... 395/567 |
| 5,889,714 A | 3/1999 | Schumann et al. .......... 365/203 |
| 5,928,343 A | 7/1999 | Farmwald et al. ........... 710/104 |
| 5,963,942 A | 10/1999 | Igata ............................... 707/6 |
| 5,966,724 A | 10/1999 | Ryan ........................... 711/105 |
| 5,973,935 A | 10/1999 | Schoenfeld et al. ......... 361/813 |
| 5,973,951 A | 10/1999 | Bechtolsheim et al. ........ 365/52 |
| 5,978,567 A | 11/1999 | Rebane et al. .......... 395/200.49 |
| 5,987,196 A | 11/1999 | Noble ............................ 385/14 |
| 6,011,741 A | 1/2000 | Wallace et al. .............. 365/221 |
| 6,023,726 A | 2/2000 | Saksena ....................... 709/219 |
| 6,029,250 A | 2/2000 | Keeth .......................... 713/400 |
| 6,031,241 A * | 2/2000 | Silfvast et al. ........... 250/504 R |
| 6,033,951 A | 3/2000 | Chao ............................ 438/253 |
| 6,038,630 A | 3/2000 | Foster et al. ................. 710/132 |
| 6,061,296 A | 5/2000 | Ternullo, Jr. et al. ........ 365/233 |
| 6,067,649 A | 5/2000 | Goodwin ..................... 714/718 |
| 6,076,139 A | 6/2000 | Welker et al. ............... 711/104 |
| 6,079,008 A | 6/2000 | Clery, III ....................... 712/11 |
| 6,092,158 A | 7/2000 | Harriman et al. ............ 711/151 |
| 6,098,158 A | 8/2000 | Lay et al. ..................... 711/162 |
| 6,111,757 A | 8/2000 | Dell et al. .................... 361/737 |
| 6,125,431 A | 9/2000 | Kobayashi ................... 711/154 |
| 6,128,703 A | 10/2000 | Bourekas et al. ............ 711/138 |
| 6,131,149 A | 10/2000 | Lu et al. ...................... 711/167 |
| 6,134,624 A * | 10/2000 | Burns et al. ................. 710/316 |
| 6,145,033 A | 11/2000 | Chee ............................ 710/57 |
| 6,175,571 B1 | 1/2001 | Haddock et al. ............. 370/423 |
| 6,185,352 B1 | 2/2001 | Hurley ........................ 385/114 |
| 6,185,676 B1 | 2/2001 | Poplingher et al. .......... 712/239 |
| 6,186,400 B1 | 2/2001 | Dvorkis et al. ........... 235/462.45 |
| 6,191,663 B1 | 2/2001 | Hannah ..................... 333/17.3 |
| 6,208,180 B1 | 3/2001 | Fisch et al. .................. 327/141 |
| 6,212,590 B1 | 4/2001 | Melo et al. .................. 710/119 |
| 6,219,725 B1 | 4/2001 | Diehl et al. .................... 710/26 |
| 6,223,301 B1 | 4/2001 | Santeler et al. ................. 714/6 |
| 6,243,831 B1 | 6/2001 | Mustafa et al. ............... 714/24 |
| 6,247,107 B1 | 6/2001 | Christie ....................... 711/216 |
| 6,249,802 B1 | 6/2001 | Richardson et al. ......... 709/200 |
| 6,256,692 B1 | 7/2001 | Yoda et al. ................... 710/104 |
| 6,266,730 B1 | 7/2001 | Perino et al. ................ 710/126 |
| 6,272,609 B1 | 8/2001 | Jeddeloh ..................... 711/169 |
| 6,286,083 B1 | 9/2001 | Chin et al. .................... 710/26 |
| 6,294,937 B1 | 9/2001 | Crafts et al. ................. 327/158 |
| 6,349,363 B1 * | 2/2002 | Cai et al. ..................... 711/129 |
| 6,370,068 B1 | 4/2002 | Rhee ........................... 365/196 |
| 6,370,611 B1 | 4/2002 | Callison et al. .............. 711/105 |
| 6,389,514 B1 | 5/2002 | Rokicki ....................... 711/136 |
| 6,392,653 B1 | 5/2002 | Malandain et al. .......... 345/501 |
| 6,401,149 B1 | 6/2002 | Dennin et al. ................. 710/58 |
| 6,401,213 B1 | 6/2002 | Jeddeloh ..................... 713/401 |
| 6,405,280 B1 | 6/2002 | Ryan ........................... 711/105 |
| 6,430,696 B1 | 8/2002 | Keeth .......................... 713/503 |
| 6,433,785 B1 | 8/2002 | Garcia et al. ................ 345/531 |
| 6,434,696 B1 | 8/2002 | Kang ............................. 713/2 |
| 6,434,736 B1 | 8/2002 | Schaecher et al. ............ 716/17 |
| 6,438,622 B1 | 8/2002 | Haghighi et al. ............... 710/1 |
| 6,438,668 B1 | 8/2002 | Esfahani et al. ............. 711/165 |
| 6,449,308 B1 | 9/2002 | Knight, Jr. et al. .......... 375/212 |
| 6,453,393 B1 | 9/2002 | Holman et al. .............. 711/154 |
| 6,457,116 B1 | 9/2002 | Mirsky et al. ................. 712/16 |
| 6,460,108 B1 | 10/2002 | McCoskey et al. .......... 710/310 |
| 6,460,114 B1 | 10/2002 | Jeddeloh ..................... 711/120 |
| 6,462,978 B1 | 10/2002 | Shibata et al. ................. 365/63 |
| 6,477,592 B1 | 11/2002 | Chen et al. .................... 710/52 |
| 6,479,322 B1 | 11/2002 | Kawata et al. ............... 438/109 |
| 6,487,556 B1 | 11/2002 | Downs et al. ................ 707/101 |
| 6,490,188 B1 | 12/2002 | Nuxoll et al. .................. 365/63 |
| 6,493,803 B1 | 12/2002 | Pham et al. .................. 711/147 |
| 6,496,193 B1 | 12/2002 | Surti et al. ................... 345/552 |
| 6,501,471 B1 | 12/2002 | Venkataraman et al. .... 345/424 |
| 6,523,092 B1 * | 2/2003 | Fanning ....................... 711/134 |
| 6,523,093 B1 * | 2/2003 | Bogin et al. ................. 711/137 |
| 6,526,483 B1 | 2/2003 | Cho et al. .................... 711/154 |
| 6,526,498 B1 | 2/2003 | Mirsky et al. ................. 712/11 |
| 6,553,479 B1 | 4/2003 | Mirsky et al. ................. 712/16 |
| 6,564,329 B1 | 5/2003 | Cheung et al. .............. 713/322 |
| 6,594,722 B1 | 7/2003 | Willke, II et al. ........... 710/313 |
| 6,598,154 B1 | 7/2003 | Vaid et al. ................... 712/237 |
| 6,615,325 B1 | 9/2003 | Mailloux et al. ............ 711/154 |
| 6,622,227 B1 | 9/2003 | Zumkehr et al. ............ 711/167 |
| 6,628,294 B1 | 9/2003 | Sadowsky et al. .......... 345/568 |
| 6,629,220 B1 | 9/2003 | Dyer ........................... 711/158 |
| 6,631,440 B1 | 10/2003 | Jenne et al. ................. 711/105 |
| 6,636,110 B1 | 10/2003 | Ooishi et al. ................ 327/565 |
| 6,646,929 B1 | 11/2003 | Moss et al. .................. 365/194 |
| 6,647,470 B1 | 11/2003 | Janzen ......................... 711/154 |
| 6,658,509 B1 | 12/2003 | Bonella et al. .............. 710/100 |
| 6,662,304 B1 | 12/2003 | Keeth et al. ................. 713/400 |
| 6,665,202 B1 | 12/2003 | Lindahl et al. ................ 365/49 |
| 6,667,895 B1 | 12/2003 | Jang et al. ..................... 365/63 |
| 6,681,292 B1 | 1/2004 | Creta et al. .................. 711/119 |
| 6,697,926 B1 | 2/2004 | Johnson et al. ............. 711/167 |
| 6,704,817 B1 | 3/2004 | Steinman et al. ........... 710/100 |
| 6,715,018 B1 | 3/2004 | Farnworth et al. .......... 710/300 |
| 6,718,440 B1 | 4/2004 | Maiyuran et al. ........... 711/137 |
| 6,721,195 B1 | 4/2004 | Brunelle et al. ............... 365/63 |
| 6,724,685 B1 | 4/2004 | Braun et al. ................. 365/233 |
| 6,728,800 B1 | 4/2004 | Lee et al. ....................... 710/54 |
| 6,735,679 B1 | 5/2004 | Herbst et al. ................ 711/167 |
| 6,735,682 B1 | 5/2004 | Segelken et al. ............ 711/220 |
| 6,745,275 B1 | 6/2004 | Chang ......................... 710/305 |
| 6,751,113 B1 | 6/2004 | Bhakta et al. .................. 365/63 |
| 6,751,703 B1 | 6/2004 | Chilton ........................ 711/113 |
| 6,751,722 B1 | 6/2004 | Mirsky et al. ................. 712/15 |
| 6,754,117 B1 | 6/2004 | Jeddeloh ..................... 365/201 |
| 6,754,812 B1 | 6/2004 | Abdallah et al. ............ 712/234 |

| Patent/Pub No. | Date | Inventor | Class |
|---|---|---|---|
| 6,756,661 B1 | 6/2004 | Tsuneda et al. | 257/673 |
| 6,760,833 B1 | 7/2004 | Dowling | 712/34 |
| 6,771,538 B1 | 8/2004 | Shukuri et al. | 365/185.05 |
| 6,775,747 B1 | 8/2004 | Venkatraman | 711/137 |
| 6,785,780 B1 | 8/2004 | Klein et al. | 711/148 |
| 6,789,173 B1 | 9/2004 | Tanaka et al. | 711/147 |
| 6,792,059 B1 | 9/2004 | Yuan et al. | 375/354 |
| 6,792,496 B1 | 9/2004 | Aboulenein et al. | 71/306 |
| 6,795,899 B1 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B1 | 10/2004 | Wiliams | 711/170 |
| 6,804,764 B1 | 10/2004 | LaBerge et al. | 711/170 |
| 6,807,630 B1 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B1 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,829,705 B1 | 12/2004 | Smith | 713/1 |
| 6,889,304 B1 | 5/2005 | Perego et al. | 711/170 |
| 6,904,556 B1 | 6/2005 | Walton et al. | 714/766 |
| 6,910,109 B1 | 6/2005 | Holman et al. | 711/156 |
| 6,947,672 B1 | 9/2005 | Jiang et al. | 398/135 |
| 2001/0039612 A1 | 11/2001 | Lee | 713/2 |
| 2002/0116588 A1 | 8/2002 | Beckert et al. | 711/161 |
| 2002/0144064 A1 * | 10/2002 | Fanning | 711/144 |
| 2002/0178319 A1 | 11/2002 | Sanchez-Olea | 710/305 |
| 2003/0005223 A1 * | 1/2003 | Coulson et al. | 711/118 |
| 2003/0043158 A1 | 3/2003 | Wasserman et al. | 345/545 |
| 2003/0065836 A1 | 4/2003 | Pecone | 710/62 |
| 2003/0093630 A1 | 5/2003 | Richard et al. | 711/154 |
| 2003/0095559 A1 | 5/2003 | Sano et al. | 370/419 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229762 A1 | 12/2003 | Maiyuran et al. | 711/137 |
| 2003/0229770 A1 * | 12/2003 | Jeddeloh | 711/213 |
| 2004/0019728 A1 | 1/2004 | Sharma | 710/306 |
| 2004/0022094 A1 | 2/2004 | Radhakrishnan et al. | 365/200 |
| 2004/0044833 A1 | 3/2004 | Ryan | 711/5 |
| 2004/0064602 A1 | 4/2004 | George | 710/22 |
| 2004/0122988 A1 | 6/2004 | Han et al. | 710/5 |
| 2004/0126115 A1 | 7/2004 | Levy et al. | 398/116 |
| 2004/0128449 A1 | 7/2004 | Osborne et al. | 711/137 |
| 2004/0144994 A1 | 7/2004 | Lee et al. | 257/200 |
| 2004/0158677 A1 | 8/2004 | Dodd | 711/118 |
| 2005/0044327 A1 | 2/2005 | Howard et al. | 711/147 |
| 2005/0071542 A1 * | 3/2005 | Weber et al. | 711/105 |
| 2005/0166006 A1 | 7/2005 | Talbot et al. | 711/105 |

* cited by examiner

MEMORY HUB AND ACCESS METHOD HAVING INTERNAL ROW CACHING

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

One technique that has been used to reduce latency in memory devices is a cache memory, which stores data recently accessed from system memory. The cache memory is generally in the form of a static random access memory ("SRAM"), which has a substantially shorter access time compared to dynamic random access memory ("DRAM") typically used as system memory. Furthermore, the SRAM cache memory is generally coupled directly to the processor through a processor bus rather than through a system controller or the like as is typical with DRAM system memory. As a result of the faster speed of cache memory and the closer proximity of cache memory to the processor, the use of cache memory can greatly reduce the latency of memory read operations.

Although conventional cache memory has reduced memory access latencies in conventional computer systems, cache memory has not been used in a manner that provides optimum performance in computer systems using memory hubs. In particular, the limited storage capacity of typical cache memories compared to the vastly larger capacity of typical memory hub system memories makes cache memory of lesser value since a cache hit is less likely to occur. This problem is exacerbated by the difficulty in transferring data to cache memory that is likely to be the subject of subsequent memory requests. More specifically, it is difficult to couple the data that will subsequently be needed from all of the memory modules through the memory controller to the processor and then from the processor to the cache memory. Also, it can be difficult to maintain cache coherency in a computer system using memory hubs and a cache memory coupled to the processor through the processor bus, and it can require significant hardware resources to maintain cache coherency. Furthermore, the time required to maintain cache coherency can slow memory performance to the extent that much of the performance advantages of using cache memory can be lost.

There is therefore a need for a computer architecture that provides the advantages of a memory hub architecture and also minimize this latency problems common in such systems, thereby providing a memory devices with high bandwidth and low latency.

SUMMARY OF THE INVENTION

A plurality of memory modules are coupled to a controller in a computer system. Each of the memory modules includes a plurality of memory devices and a memory hub. The memory hub comprises a link interface coupled to the controller and a memory device interface coupled to the memory devices. The link interface receives memory requests from the controller for access to a row of memory cells in at least one of the memory devices. The link interface transfers the memory requests to the memory device interface, which then couples the memory requests to the memory devices for access to a row of memory cells in at least one of the memory devices. The memory device interface then receives the read data from the memory devices responsive to at least some of the memory requests. Each of the memory hubs also includes a row cache memory coupled to the memory device interface for receiving and storing read data responsive to at least one of the memory requests. A sequencer that is also included in the memory hub is coupled to the link interface, the memory device interface and the row cache memory. The sequencer generates and couples to the memory device interface memory requests to read data from memory cells in a row of memory cells being accessed responsive to a memory request transferred from the link interface to the memory device interface. The read data from the memory cells in the row of memory cells being accessed responsive to the generated memory requests are also stored in the row cache memory. The sequencer preferably generates the memory requests when memory requests are not being received from the controller.

DETAILED DESCRIPTION OF THE INVENTION

Figure 1:
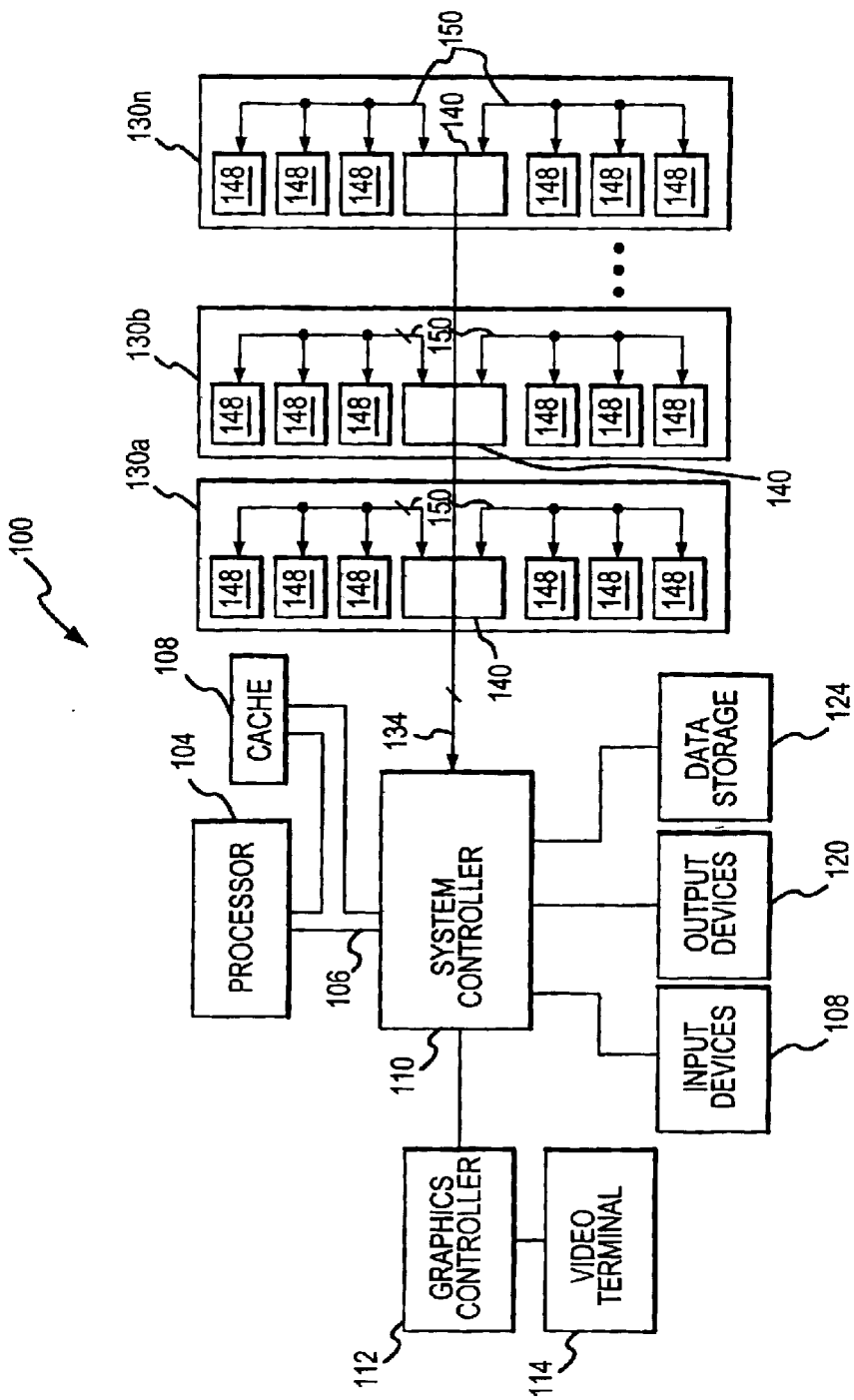
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a,b. . . n, which serve as system memory for the computer system 100. The memory modules 130 are preferably coupled to the system controller 110 through a high-speed link 134, which may be an optical or electrical communication path or some other type of communications path. In the event the high-speed link 134 is implemented as an optical communication path, the optical communication path may be in the form of one or more optical fibers, for example. In such case, the system controller 110 and the memory modules will include an optical input/output port or separate input and output ports coupled to the optical communication path. The memory modules 130 are shown coupled to the system controller 110 in a multi-drop arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the system controller 110. A switching topology may also be used in which the system controller 110 is selectively coupled to each of the memory modules 130 through a switch (not shown). Other topologies that may be used will be apparent to one skilled in the art.

Figure 2:
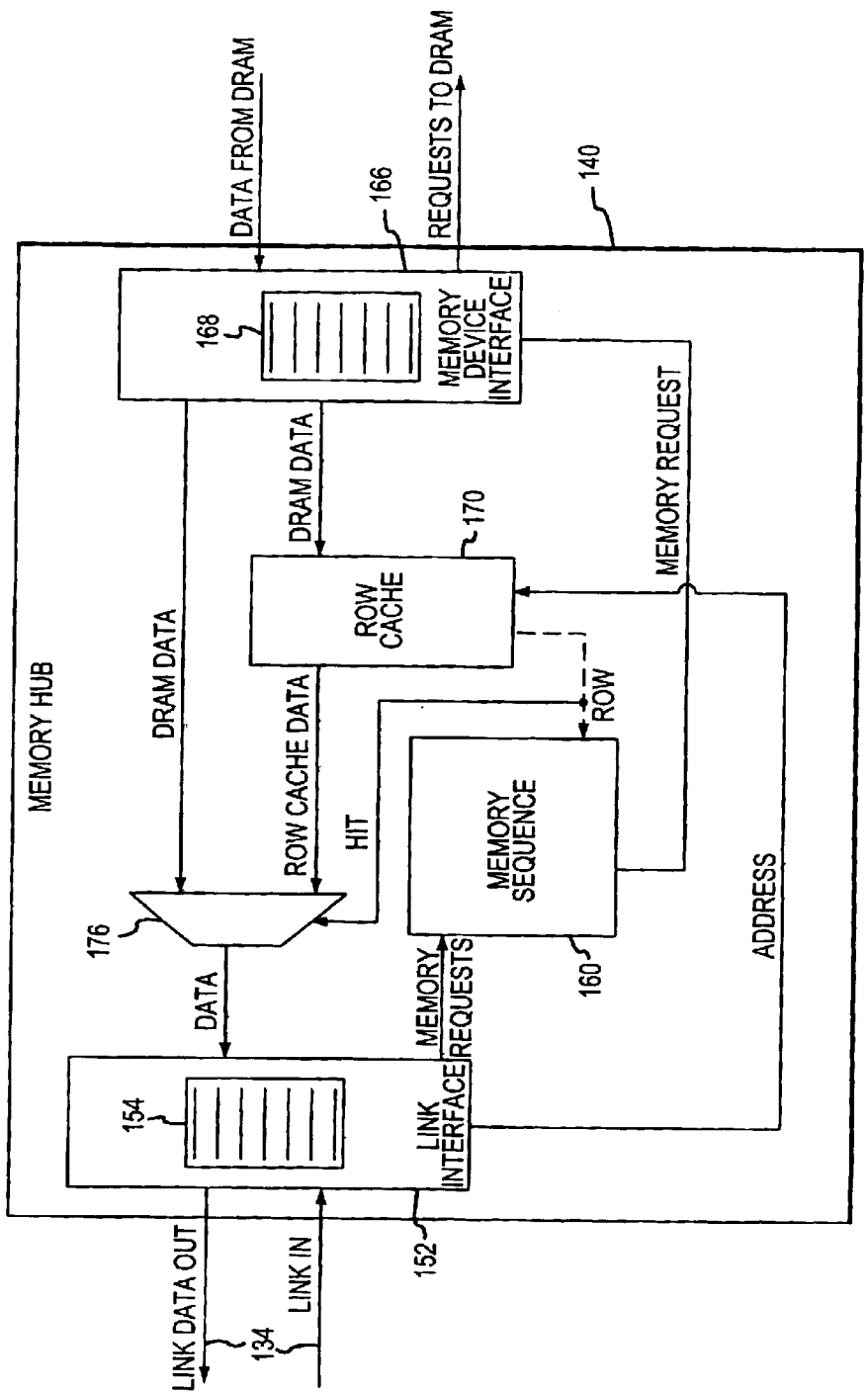
FIG. 2 is a block diagram of a memory hub used in the computer system of FIG. 1.

Each of the memory modules 130 includes a memory hub 140 for controlling access to 6 memory devices 148, which, in the example illustrated in FIG. 2, are synchronous dynamic random access memory ("SDRAM") devices. However, a fewer or greater number of memory devices 148 may be used, and memory devices other than SDRAM devices may, of course, also be used. The memory hub 140 is coupled to each of the system memory devices 148 through a bus system 150, which normally includes a control bus, an address bus and a data bus.

One example of the memory hub 140 of FIG. 1 is shown in FIG. 2. The memory hub 140 includes a link interface 152 that is coupled to the high-speed link 134. The nature of the link interface 152 will depend upon the characteristics of the high-speed link 134. For example, in the event the high-speed link 134 is implemented using an optical communications path, the link interface 152 will include an optical input/output port and will convert optical signals coupled through the optical communications path into electrical signals. In any case, the link interface 152 preferably includes a buffer, such as a first-in, first-out buffer 154, for receiving and storing memory requests as they are received through the high-speed link 134. The memory requests are stored in the buffer 154 until they can be processed by the memory hub 140.

When the memory hub 140 is able to process a memory request, one of the memory requests stored in the buffer 154 is transferred to a memory sequencer 160. The memory sequencer 160 converts the memory requests from the format output from the system controller 110 into a memory request having a format that can be used by the memory devices 148. These re-formatted request signals will normally include memory command signals, which are derived from memory commands contained in the memory request received by the memory hub 140, and row and column address signals, which are derived from an address contained in the memory request received by the memory hub 140. In the event the memory request is a write memory request, the re-formatted request signals will normally include write data signals which are derived from write data contained in the memory request received by the memory hub 140. For example, where the memory devices 148 are conventional DRAM devices, the memory sequencer 160 will output row address signals, a row address strobe ("RAS") signal, an active high write/active low read signal ("W/R*"), column address signals and a column address strobe ("CAS") signal. The re-formatted memory requests are preferably output from the sequencer 160 in the order they will be used by the memory devices 148.

The memory sequencer 160 applies the re-formatted memory requests to a memory device interface 166. The nature of the memory device interface 166 will again depend upon the characteristics of the memory devices 148. In any case, the memory device interface 166 preferably includes a buffer, such as a FIFO buffer 168, for receiving and storing one or more memory requests as they are received from the link interface 152. The memory requests are stored in the buffer 168 until they can be processed by the memory devices 148. However, in the event the memory device interface 166 stores several memory requests, the memory device interface 166 may re-order the memory requests so that they are applied to the memory devices in some other order. For example, the memory requests may be stored in the interface 166 in a manner that causes one type of request, e.g., read requests to be processed before other types of requests, e.g., write requests.

The memory requests are described above as being received by the memory hub 140 in a format that is different from the format that the memory requests are applied to the memory devices 148. However, the system controller 110 may instead re-format memory requests from the processor 104 (FIG. 1) to a format that can be used by the memory devices 148. In such case, it is not necessary for the sequencer 160 to re-format the memory request. Instead, the sequencer 160 simply schedules the re-formatted memory request signals in the order needed for use by the memory devices 148. The memory request signals for one or more memory requests are then transferred to the memory device interface 166 so they can subsequently be applied to the memory devices 148.

As previously explained, one of the disadvantages of using memory hubs is the increased latency they can sometimes create. As also previously explained, a cache memory in the processor 104 or coupled to the processor bus 106 (FIG. 1), which is the traditional approach to reducing memory read latency, is not well suited to a memory system using memory hubs. The memory hub 140 example shown in FIG. 2 provides relatively low memory read latency by including a row cache memory 170 in each of the memory hubs 140. The row cache memory 170 may be similar in design to conventional cache systems including a data memory (not shown), a tag memory (not shown), and conventional address comparison logic (not shown). The row cache memory 170 stores data contained in one or more previously addressed rows of memory cells in one or more of the memory devices 148 in the module 140. The row cache memory 170 receives addresses forming part of a memory request from the link interface 152, which are compared to addresses of cached data. In the event of an address match, which indicates that the data being fetched by the memory request is stored in the row cache memory 170, the memory 170 outputs the requested data and a "ROW HIT" signal indicative of a cache hit. The ROW HIT signal is applied to a multiplexer 176 to cause the data from the cache memory 170 to be coupled to the link interface 152. In the event of a row cache miss, the multiplexer 176 couples data from the memory device interface 166 to the link interface 152. The ROW HIT signal is also applied to the memory sequencer 160 so that the sequencer will not couple the memory request to the memory device interface 166 in the event of a row hit since the data called for by the memory request has already been supplied by the row cache memory 170.

Although the row cache memory 170 may store data only from columns in a row that have been previously accessed, the memory 170 preferably pre-fetches data from many or all of the columns in the cached row when the memory hub 140 is not busy responding to memory requests from the system controller 110. More specifically, the memory sequencer 160 contains conventional circuitry to keep track of which columns of a row being accessed have had the data stored therein transferred to the row cache memory 170. When the sequencer 160 is not busy servicing memory requests from the link interface 152, the sequencer 160 generates memory requests, which are applied to the memory device interface 166, to cause data stored in the remaining columns of an addressed row to be transferred to the row cache memory 170. As a result, since memory accesses are typically to a series of memory locations in the same row, the row cache memory 170 is likely to be storing data that will be fetched in subsequent memory requests.

The memory hub 140 can process a subsequent memory request directed to a new row of memory cells in one of the memory devices 148 using a variety of procedures. For example, if the row cache memory 170 is capable of storing data from more than one row, the sequencer 160 can simply cause the data stored in the subsequently accessed row to be transferred to the row cache memory 170. If the row cache memory 170 is capable of storing data from only a single row of memory cells, or the cache memory 170 has otherwise reached its storage capacity, the data stored in the newly accessed row of memory cells can simply overwrite the previously stored data.

Although not shown in FIG. 2 or discussed above, the memory hub 140 preferably includes circuitry for maintaining cache consistency using conventional memory cache techniques. For example, the hub 140 may employ a "write through" mode of operation or a "write back" mode of operation in the event of a memory request for a write to a location followed by a memory request for a read from that same location.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer system, comprising:
 a central processing unit ("CPU");
 a system controller coupled to the CPU, the system controller having an input port and an output port;
 an input device coupled to the CPU through the system controller;
 an output device coupled to the CPU through the system controller;
 a storage device coupled to the CPU through the system controller;
 a plurality of memory modules, each of the memory modules comprising:
  a plurality of memory devices; and
  a memory hub, comprising:
   a link interface having an input port and an output port, the link interface receiving memory requests through the input port for access to a row of memory cells in at least one of the memory devices and outputting data through the output port responsive to the memory requests;
   a memory device interface coupled to the memory devices, the memory device interface being operable to couple memory requests to the memory devices for access to a row of memory cells in at least one of the memory devices and to receive read data responsive to at least some of the memory requests, at least some of the memory requests coupled to the memory devices being responsive to memory requests transferred from the link interface to the memory device interface;

a row cache memory coupled to the memory device interface for receiving and storing read data from a row of memory cells being accessed responsive to at least one of the memory requests being coupled from the memory device interface to the at least one memory device; and a sequencer coupled to the link interface and the memory device interface and the row cache memory, the sequencer being operable to generate and couple to the memory device interface memory requests to read data from memory cells in row of memory cells being accessed, the read data read from the memory cells in the row of memory cells being accessed being stored in the row cache memory; and a communications link coupling the output port of the system controller to the input port of the memory hub in each of the memory modules, and coupling the input port of the system controller to the output port of the memory hub in each of the memory modules.

2. The computer system of claim 1 wherein the memory device interface further comprises a first-in, first-out buffer that is operable to receive and to store memory requests received from the link interface and from the sequencer and to transfer the stored memory requests to the at least one memory device in the order in which they were received.

3. The computer system of claim 1 wherein the link interface comprises a first-in, first-out buffer that is operable to receive and store memory requests and to transfer the stored memory requests to the memory device interface in the order in which they were received.

4. The computer system of claim 3 wherein the memory device interface further comprises a first-in, first-out buffer that is operable to receive and store memory requests received from the link interface and from the sequencer and to transfer the stored memory requests to the at least one memory device in the order in which they were received.

5. The computer system of claim 1 wherein the memory devices comprises dynamic random access memory devices.

6. The computer system of claim 1 wherein the sequencer is operable to output an address contained in each read memory request received from the link interface, and wherein the row cache memory is operable to receive the addresses from the sequencer to determine if data called for by the memory request is stored in the row cache memory, the row cache memory outputting the read data and generating a hit signal if the data called for by the memory request is stored in the row cache memory and generating a row miss signal if the data called for by the memory request is not stored in the row cache memory.

7. The computer system of claim 6 further comprising a multiplexer having data inputs coupled to the row cache memory and to the memory device interface, a data output coupled to the link interface and a control input coupled to receive the row cache hit and row cache miss signals from the row cache memory, the multiplexer coupling read data from the memory device interface responsive to the row cache miss signal and coupling read data from the row cache memory responsive to the row cache hit signal.

8. The computer system of claim 1 wherein the sequencer is operable to generate and couple to the memory device interface memory requests to read data from memory cells in row of memory cells being accessed only when memory requests are not being transferred from the link interface to the memory device interface.

9. The computer system of claim 1 wherein the input and output ports of the system controller comprises a combined input/output port coupled to the communications link, and wherein the input and output ports of each of the memory hubs comprises a combined input/output port coupled to the communications link.

10. The computer system of claim 9 wherein the communications link comprises optical communications link, wherein the input and output ports of the system controller comprises an optical input/output port coupled to the optical communications link and wherein the input and output ports of each of the memory hubs comprises a respective optical input/output port coupled to the optical communications link.

11. A computer system, comprising:

a central processing unit ("CPU");

a system controller coupled to the CPU, the system controller having an input port and an output port;

an input device coupled to the CPU through the system controller;

an output device coupled to the CPU through the system controller;

a storage device coupled to the CPU through the system controller;

a plurality of memory modules, each of the memory modules comprising:

a plurality of memory devices; and a memory hub, comprising:

a link interface receiving memory requests for access to a row of memory cells in at least one of the memory devices;

a memory device interface coupled to the memory devices, the memory device interface being operable to couple memory requests to the memory devices for access to a row of memory cells in at least one of the memory devices and to receive read data responsive to at least some of the memory requests, at least some of the memory requests coupled to the memory devices being responsive to memory requests transferred from the link interface to the memory device interface;

a sequencer coupled to the link interface and the memory device interface and the row cache memory, the sequencer being operable to output an address contained in each read memory request received from the link interface;

a row cache memory coupled to the memory device interface for receiving and storing read data from a row of memory cells being accessed responsive to one of the memory requests being coupled from the memory device interface to the at least one memory device, the row cache memory further being operable to receive the addresses from the sequencer to determine if data called for by the memory request is stored in the row cache memory, the row cache memory outputting the read data and generating a hit signal if the data called for by the memory request is stored in the row cache memory and generating a row miss signal if the data called for by the memory request is not stored in the row cache memory; and a multiplexer having data inputs coupled to the row cache memory and to the memory device interface; a data output coupled to the link interface and a control input coupled to receive the row cache hit and row cache miss signals from the row cache memory, the multiplexer coupling read data from the memory device interface responsive to the row cache miss signal and coupling read data from the row cache memory responsive to the row cache hit signal; and a communications link coupling the output port of the system controller to the input port of the memory hub in each of the memory modules, and coupling the input port of the system controller to the output port of the memory hub in each of the memory modules.

12. The computer system of claim 11 wherein the memory device interface farther comprises a first-in, first-out buffer that is operable to receive and store memory requests received from the link interface and from the sequencer and to transfer the stored memory requests to the at least one memory device in the order in which they were received.

13. The computer system of claim 11 wherein the link interface comprises a first-in, first-out buffer that is operable to receive and store memory requests and to transfer the stored memory requests to the memory device interface in the order in which they were received.

14. The computer system of claim 13 wherein the memory device interface further comprises a first-in, first-out buffer that is operable to receive and store memory requests received from the link interface and from the sequencer and to transfer the stored memory requests to the at least one memory device in the order in which they were received.

15. The computer system of claim 11 wherein the link interface comprises an optical input/output port.

16. The computer system of claim 11 wherein the memory devices comprises dynamic random access memory devices.

17. The computer system of claim 11 wherein the input and output ports of the system controller comprises a combined input/output port coupled to the communications link, and wherein the input and output ports of each of the memory hubs comprises a combined input/output port coupled to the communications link.

18. The computer system of claim 17 wherein the communications link comprises an optical communications link, wherein the input and output ports of the system controller comprises an optical input/output port coupled to the optical communications link and wherein the input and output ports of each of the memory hubs comprises a respective optical input/output port coupled to the optical communications link.

* * * * *